(12) United States Patent
Deiss et al.

(10) Patent No.: US 10,603,748 B2
(45) Date of Patent: Mar. 31, 2020

(54) PRODUCTION OF A COMPONENT BY SELECTIVE LASER MELTING

(71) Applicant: SIEMENS AKTIENGESELLSCHAFT, München (DE)

(72) Inventors: Olga Deiss, Düsseldorf (DE); Julian Timmermann, Gelsenkirchen (DE)

(73) Assignee: Siemens Aktiengesellschaft, München (DE)

( * ) Notice: Subject to any disclaimer, the term of this patent is extended or adjusted under 35 U.S.C. 154(b) by 619 days.

(21) Appl. No.: 14/923,545

(22) Filed: Oct. 27, 2015

(65) Prior Publication Data

US 2016/0121430 A1 May 5, 2016

(30) Foreign Application Priority Data

Oct. 31, 2014 (DE) .................. 10 2014 222 302

(51) Int. Cl.
*B23K 26/34* (2014.01)
*B33Y 10/00* (2015.01)
(Continued)

(52) U.S. Cl.
CPC .......... *B23K 26/342* (2015.10); *B22F 3/1055* (2013.01); *B23K 26/354* (2015.10);
(Continued)

(58) Field of Classification Search
CPC ................. B22F 3/105; B22F 3/1055; B22F 2003/1056; B22F 15/0086; B23K 26/034;
(Continued)

(56) References Cited

U.S. PATENT DOCUMENTS

| 6,600,129 B2 * | 7/2003 | Shen ................... B29C 64/153 |
| | | 219/121.61 |
| 8,021,138 B2 * | 9/2011 | Green .................. B22F 3/1055 |
| | | 425/174.4 |

(Continued)

FOREIGN PATENT DOCUMENTS

| CN | 1213598 A | 4/1999 |
| CN | 102113060 A | 6/2011 |

(Continued)

OTHER PUBLICATIONS

Chinese Office Action and Search Report with the English translation for CN Application No. 201510729578.5, dated Apr. 12, 2017.

(Continued)

*Primary Examiner* — Brian W Jennison
(74) *Attorney, Agent, or Firm* — Schmeiser, Olsen & Watts LLP

(57) ABSTRACT

A method for producing a component by selective laser melting, wherein a number of lasers arranged next to one another generate a laser field, as a result of which powdery material can be melted in a selective manner for the purposes of generating contours. In the process, individual lasers of the laser arrangement can be switched on or off in a selective matter in order to irradiate or not irradiate certain regions. Furthermore, a device for carrying out the method is provided.

8 Claims, 3 Drawing Sheets

(51) Int. Cl.
*B23K 26/342* (2014.01)
*B33Y 30/00* (2015.01)
*B23K 26/354* (2014.01)
*B22F 3/105* (2006.01)
*B29C 64/153* (2017.01)

(52) U.S. Cl.
CPC ............ *B29C 64/153* (2017.08); *B33Y 10/00* (2014.12); *B33Y 30/00* (2014.12); *B22F 2003/1056* (2013.01); *Y02P 10/295* (2015.11)

(58) Field of Classification Search
CPC .............. B23K 26/083; B23K 26/0821; B29C 64/153; B29C 67/0077
USPC ....................................................... 219/76.12
See application file for complete search history.

(56) References Cited

U.S. PATENT DOCUMENTS

| | | | | |
|---|---|---|---|---|
| 2002/0195747 | A1* | 12/2002 | Hull | ........................ B29C 41/12 |
| | | | | 264/401 |
| 2003/0059492 | A1* | 3/2003 | Gaillard | .................. B05C 11/02 |
| | | | | 425/258 |
| 2010/0007062 | A1* | 1/2010 | Larsson | ................ B22F 3/1055 |
| | | | | 264/485 |
| 2011/0122999 | A1 | 5/2011 | Vogtmeier | |
| 2011/0293771 | A1* | 12/2011 | Oberhofer | ............. B22F 3/1055 |
| | | | | 425/182 |
| 2012/0162344 | A1 | 6/2012 | Raksha | |
| 2013/0199013 | A1* | 8/2013 | Graichen | .................. B22F 9/24 |
| | | | | 29/402.09 |
| 2014/0271328 | A1* | 9/2014 | Burris | .................. B23K 26/034 |
| | | | | 419/53 |
| 2014/0348691 | A1* | 11/2014 | Ljungblad | ............ B22F 3/1055 |
| | | | | 419/53 |
| 2015/0004045 | A1* | 1/2015 | Ljungblad | ............ B22F 3/1035 |
| | | | | 419/47 |
| 2016/0114427 | A1 | 4/2016 | Eibl et al. | |

FOREIGN PATENT DOCUMENTS

| | | |
|---|---|---|
| CN | 102555434 A | 7/2012 |
| CN | 104028757 A | 9/2014 |
| DE | 102010048335 A1 | 4/2012 |
| DE | 102011119319 A1 | 5/2013 |
| EP | 2335848 A1 | 6/2011 |
| EP | 2909007 A1 | 8/2015 |
| FR | 2998497 A1 | 5/2014 |
| WO | WO 2011066989 A1 | 6/2011 |
| WO | WO 2011114296 A1 | 9/2011 |

OTHER PUBLICATIONS

European Search Report for application No. 15 184 397.6 dated Jul. 16, 2019.

* cited by examiner

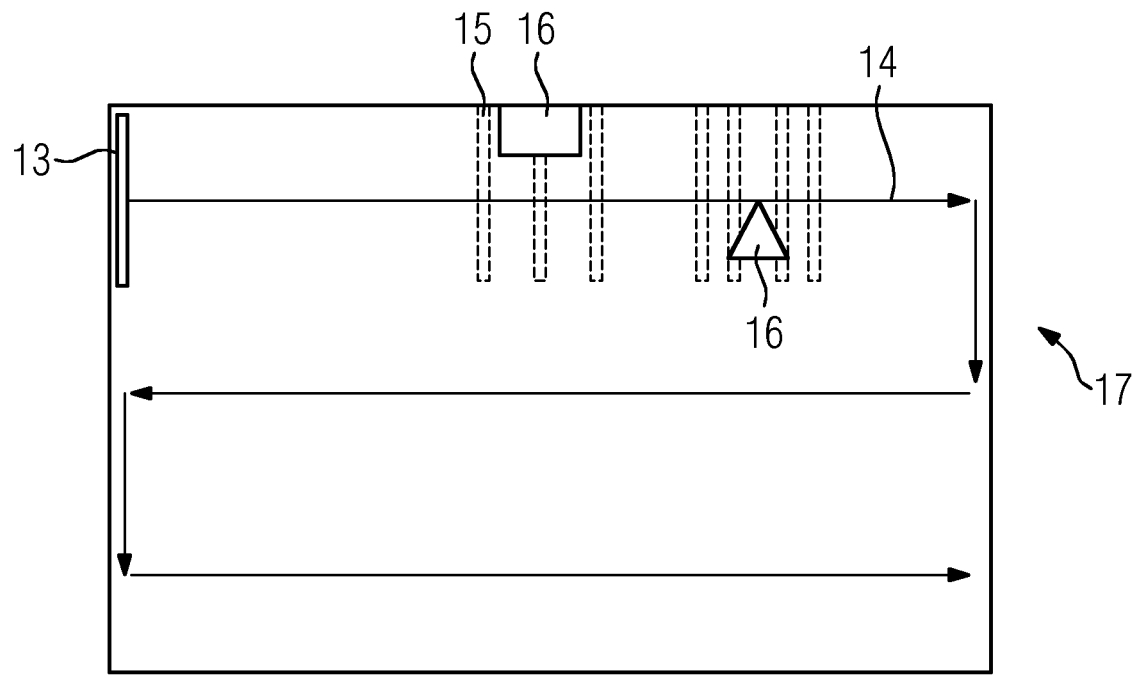

PRODUCTION OF A COMPONENT BY SELECTIVE LASER MELTING

CROSS-REFERENCE TO RELATED APPLICATIONS

This application claims priority to German Application No. 102014222302.4 having a filing date of Oct. 31, 2014, the entire contents of which are hereby incorporated by reference.

FIELD OF TECHNOLOGY

The following relates to a method for producing a component by selective laser melting by means of an arrangement of lasers, wherein individual lasers of the arrangement can be switched on or off in a selective manner during the irradiation for the purposes of producing specific structures.

BACKGROUND

Components with a complicated geometrical form can only be made with much outlay using machining manufacturing methods. Conventionally, such parts are generable using various casting methods. However, making a cast is expensive and time consuming. Thus, although casting methods are useful for mass and series production with a long enough lead time, they are not useful for manufacturing small numbers or in the case of high urgency.

Relatively novel processes for the quick production of individual components include selective laser melting (SLM) and the similar selective laser sintering. Here, the material to be processed is applied as a powder in one layer on a platform or a material layer. Laser radiation is used to completely remelt the powder particles locally. By fusing the powder particles, the powder particles are also fused to a layer lying therebelow. Compared to the aforementioned casting methods, SLM is distinguished by there being no need for tools or molds and, as a result, it being possible to produce prototypes within a relatively short period of time. Furthermore, as a result of the great freedom of SLM in terms of geometry, it is possible to produce components that cannot be produced, or only be produced with great difficulties, using mold-bound methods.

In the SLM method, laser radiation is applied onto an area of powdery material where contours of the component to be produced are intended to be created. After the melting and subsequent re-hardening of the material, a new layer of powdery material is applied and the laser radiation is once again applied. As a result of the laser radiation, it is possible to realize a very high method speed and components made of thousands of layers can be generated within one day. However, a disadvantage exists in the fusing of relatively large areas. The incident laser beam only has a point-like impact area with a small diameter, as a result of which the irradiation of a relatively large area is time consuming, particularly in the case of relatively large components.

Thus, there is the problem of providing a method by means of which the productivity of the SLM can be designed in a more time-effective manner. Furthermore, there is the problem of providing a device for carrying out a corresponding method.

SUMMARY

An aspect relates to a method for producing a component by selective laser melting, comprising the following steps:

S1) providing a building platform in a manufacturing cylinder,
S2) applying a certain amount of powdery material on the building platform,
S3) distributing the material over the building platform,
S4) locally fusing powder particles by the action of a laser beam,
S5) lowering the platform, wherein steps S2-S5 are repeated a number of times, as is required for completing the component and wherein a number of lasers arranged next to one another direct the beams thereof onto a region to be irradiated in such a way that the irradiated region corresponds to a rectangular area.

In the method according to embodiments of the invention, the incident energy is advantageously not realized as a point, but rather as an elongate rectangle. The impact field therefore consists of a plurality of laser points arranged next to one another and, in the process, has the form of a bar. The method is advantageous because the productivity of the SLM can be substantially accelerated by irradiating an area. The whole path to be passed over is reduced compared to the use of a single laser and comparatively large areas can be melted within a short period of time by the action of a laser. Here, the radiation from the laser arrangement, i.e. the arrangement of the lasers arranged next to one another, which is also referred to as laser head, is guided along fixed trajectories over a region of the component to be generated.

Here, it is particularly preferable for one or more of the lasers of the laser arrangement to be switched on or off in a selective manner and independently of the other lasers for the purposes of generating a desired geometry of the component. Preferably, in the process, one or more lasers are not switched on in a selective manner and independently of the other lasers if there should be no local fusion of the material for the purposes of generating a desired geometry of the component, i.e. if no contour should be generated and if, accordingly, there should be no radiation. When all lasers of the arrangement are switched on, it is likewise preferred here if, in accordance with the contours to be generated, individual lasers of the laser arrangement are switched off along the predetermined trajectory in a selective manner and independently of the other lasers if there should be no local fusion of the material for the purposes of generating a desired geometry of the component, i.e. if no contour should be generated and if, accordingly, there should be no radiation. If a contour should again be generated along the given trajectory, the previously switched off laser is switched back on again.

Preferably, the powdery material melted in the method according to embodiments of the invention comprises a metal. Advantageously, metals can easily be processed into a power and returned to compact forms by melting. Here, metals are suitable materials for many technical components, e.g. for turbine blades. Here, it is particularly preferred for the powdery material to consist of a metal alloy.

A second aspect of the invention relates to a device for producing a component by selective laser melting, in particular for carrying out the method as claimed in one of the preceding claims, comprising a manufacturing cylinder with a building platform, a storage cylinder, a distribution apparatus, an arrangement of a number of lasers and a control apparatus, wherein the arrangement of the lasers enables the irradiation of a rectangular area and the lasers can be switched on and off individually. Here, the advantages of the device correspond to those of the method according to embodiments of the invention.

Preferably, the lasers of the device are arranged next to one another in a rectangular pattern. In this pattern, the lasers are combined in an arrangement called a laser head. This arrangement advantageously enables the irradiation of a rectangular area.

Preferably, the pattern of switching the lasers is controlled by the control apparatus. Here, the contours to be generated per layer of the component are programmed in such a way that, for each trajectory of the laser head to be passed over, the control apparatus can advantageously calculate and control the position at which individual lasers are to be switched off and/or on.

Furthermore, the beam path of the laser beams is preferably guidable by at least one rotatable mirror, i.e. at least one mirror that is adjustable by rotation. The beams of the lasers are aligned by way of optical auxiliary means in parallel on the rotatable mirror or mirrors which, in accordance with the settings thereof, direct or directs the beams onto the points to be irradiated of the component to be produced.

In the present application, lasers are devices by means of which laser beams are generated. A plurality of lasers arranged together next to one another are referred to as laser head. The laser beam path denotes the theoretical path of a laser beam assumed in accordance with the alignment thereof by the laser and rotatable mirrors.

Contours denote solid regions of the component to be produced.

BRIEF DESCRIPTION

Some of the embodiments will be described in detail, with reference to the following figures, wherein like designations denote like members, wherein:

FIG. 5 shows a schematic illustration of an area to be irradiated by the method in accordance with FIG. 2.

DETAILED DESCRIPTION

Figure 1:
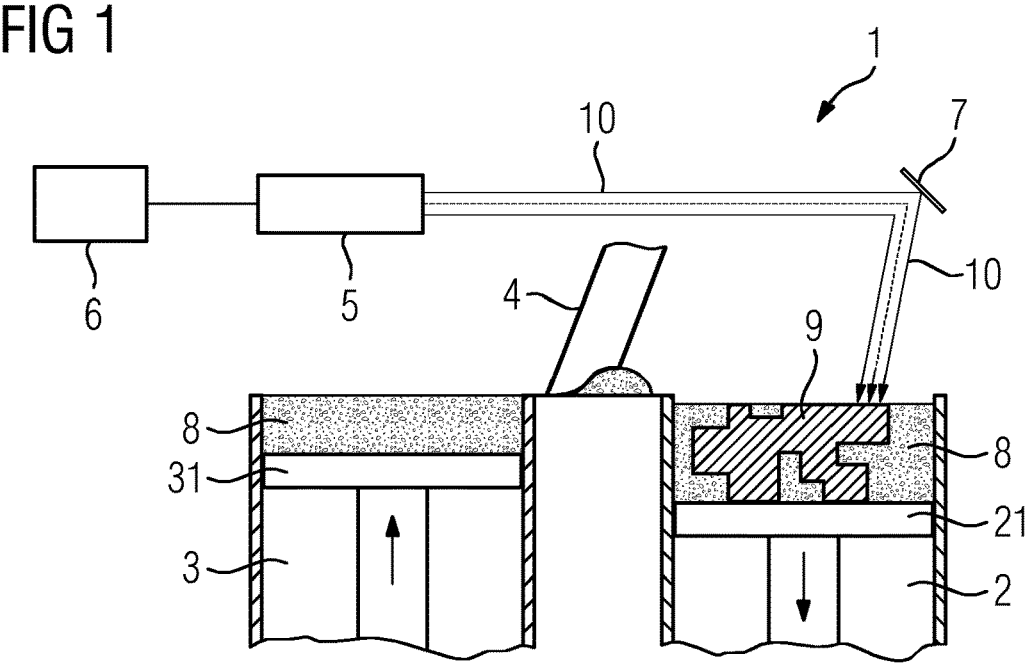
FIG. 1 shows a schematic illustration of an exemplary embodiment of the device.

In the embodiment depicted in an exemplary manner in FIG. 1, the device 1 comprises a manufacturing cylinder 2, on the building platform 21 of which the component 9 to be manufactured by selective laser melting (SLM) from powdery material 8 is generated layer-by-layer, a storage cylinder 3, which keeps the powdery material 8 available and from which the material 8 can gradually be transferred by lifting the base of the storage container 31 upward and, from there, it can transferred onto the building platform 21 and distributed there layer-by-layer using a distribution apparatus 4, which is also referred to as a squeegee. Furthermore, the device 1 comprises an arrangement of lasers 5, also referred to as laser head 5, which generate laser beams for irradiating the powdery material 8 on the building platform 21. Here, the number of lasers 5 is selected in such a way that, firstly, a rectangular area can effectively be irradiated and hence melted by the laser and, secondly, the lasers arranged next to one another do not influence one another by the heat buildup. The number of lasers is at least 2, preferably up to 4, likewise preferably up to 6, likewise preferably up to 10, likewise preferably up to 15, likewise preferably up to 20 and likewise preferably up to 24. Furthermore, the device 1 comprises a control apparatus 6 which, on the basis of the contours of the component to be generated and a current position of the laser head 5, calculates and controls the switching off and on of individual lasers of the arrangement. Adjustable mirrors 7 are embodied to guide the beam path of the laser beams 10 onto the powdery material 8 on the building platform 21. The mirrors are adjusted under software control, with the control apparatus 6 additionally being embodied to control the movement of the mirrors. Contours of the component 9 to be manufactured can be generated by melting of the powdery material 8 under the action of the laser beams 10. The platform 21 of the manufacturing cylinder 2 is embodied to be lowered by a thickness or strength of a layer after a layer of the component 9 to be manufactured has been formed, whereupon a new layer of the powdery material 8 can be applied by the distribution apparatus 4.

Figure 2:
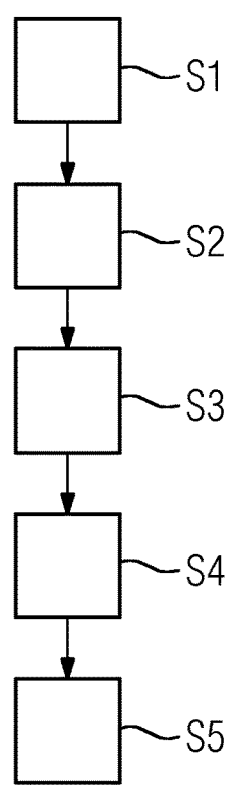
FIG. 2 shows a flowchart of an exemplary embodiment of the method.

In the embodiment of FIG. 2, shown in an exemplary manner, a component is produced by selective laser melting. To this end, a building platform 21 is provided in a manufacturing cylinder 2 in step S1. In step S2, an amount of powdery material, preferably made of a metal or a metal alloy, which is adequate for forming a layer is applied onto the building platform 21 from the storage cylinder 3 by means of the distribution apparatus 4. In step S3, the applied material 8 is distributed on the building platform 21 by means of the distribution apparatus 4 in such a way that a layer is formed with a strength that can easily be melted by the laser beams in accordance with the desired contour. Here, preferred layer strengths are 20-100 μm.

In step S4 there is local fusing of powdery material 8 under the action of one or more laser beams 101, which are generated by the laser 5 and guided by means of rotatable mirrors 7 over the building platform 21 under software control in such a way that the desired contours are created. Here, the laser beams 101 from lasers 5 arranged next to one another in a laser head are directed onto a region to be irradiated in such a way that the irradiated region corresponds to a rectangular area.

The powdery material is completely remelted at the points of the laser radiation and forms a solid material layer after going rigid. In step S5 the building platform 21 is lowered by one layer strength and steps S2-S5 are repeated until the component 9 to be produced is finished. In other words, the incident laser beams 101 generate the contours of the component 9 layer-by-layer according to a predetermined pattern.

Figure 3:
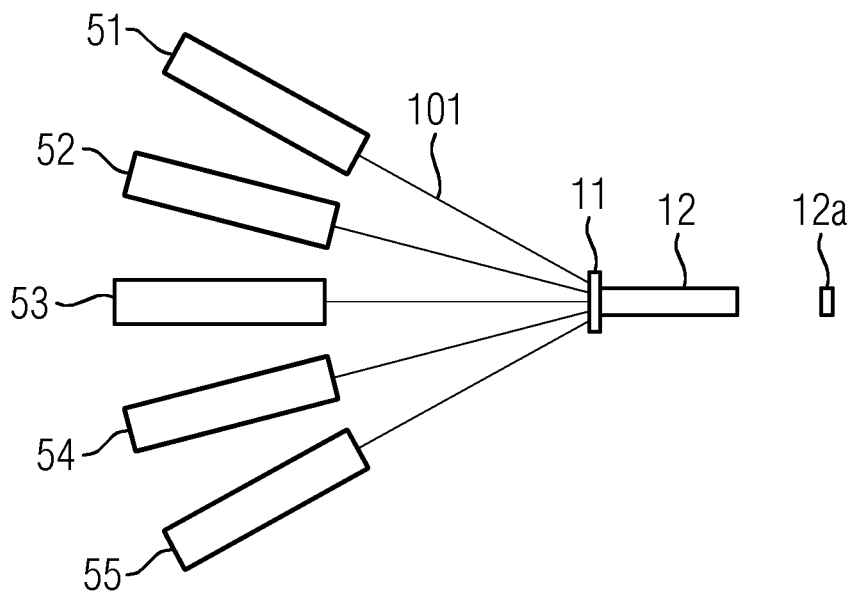
FIG. 3 shows the method in accordance with FIG. 2 in a schematic illustration.

In accordance with the exemplary illustration in FIG. 3, lasers 51, 52, 53, 54, 55 arranged next to one another in the laser head are excited and emit laser beams 101, which are focused by a focusing lens 11 and aligned in parallel, whereupon the common beam path 12 thereof has a rectangular cross section 12a. The beams are guided in parallel in a rectangular shaped field 13 over the building platform 21 by way of one or more rotatable mirrors 7, and so material 8 is melted in this rectangular shaped field.

Figure 4:
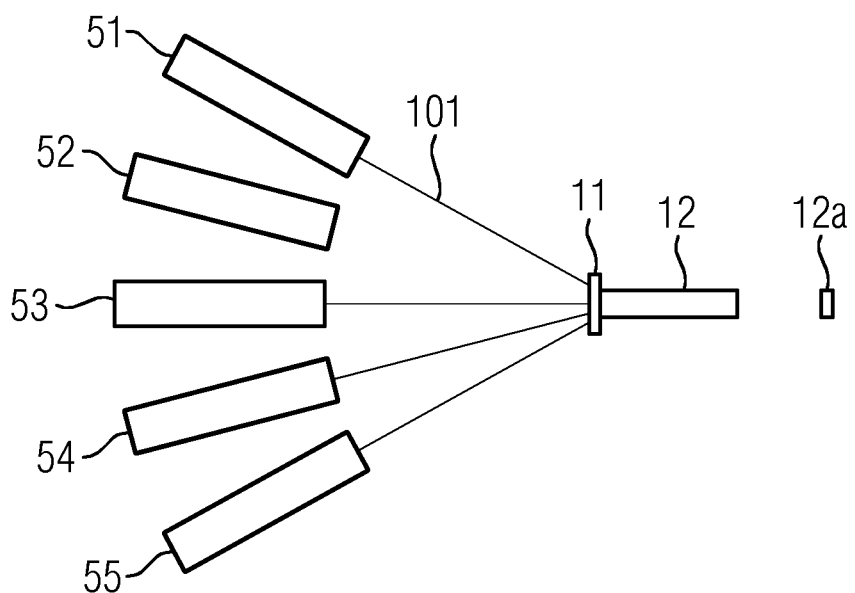
FIG. 4 shows the method in accordance with FIG. 2 in a schematic illustration.

FIG. 4 depicts the laser arrangement from FIG. 3, in which, in an exemplary manner, laser 52 is switched off because a specific region of the powdery material 8 should not be melted because no solid contours are envisaged there. If a solid contour should once again be generated in the beam path of the laser 52 after an envisaged gap, said laser is switched on again. Switching the laser 52 on and off is controlled by the control apparatus 6.

The guided path of the laser field 13, which is formed in a rectangular or bar-shaped manner by the laser beams and also referred to as irradiation path 14, is indicated by arrows 14 in FIG. 5. The dashed lines denote portions 15 of the material 8 on the building platform 21 over which the laser field 13 is at a specific point in time. Here, the gaps 16 are points that should not be melted. One or more lasers 5 are switched off over these points, and so no solid contours of the component 9 to be produced are generated there.

Developments and modifications of the invention that are obvious to a person skilled in the art fall under the scope of protection of the patent claims.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for producing a component by selective laser melting, comprising the following steps:
   S1) providing a building platform in a manufacturing cylinder;
   S2) applying an amount of a powdery material on the building platform;
   S3) distributing the powdery material over the building platform;
   S4) locally fusing powder particles by an action of a laser beam; and
   S5) lowering the building platform;
      wherein steps S2)-S5) are repeated a number of times, as is required for completing the component, further wherein a laser arrangement including a plurality of lasers is arranged next to one another to direct the laser beams thereof onto a region to be irradiated in such a way that the irradiated region corresponds to a rectangular area;
         wherein one or more of the lasers of the laser arrangement are switched on and off in a selective manner and independently of the other lasers for the purposes of generating a desired geometry of the component, along a predetermined trajectory across an area to be irradiated, wherein each of the lasers of the laser arrangement is capable of traveling along the entire predetermined trajectory, such that each of the one or more lasers are:
            (i) switched on if there should be local fusion of the material along the predetermined trajectory, and
            (ii) switched off in a selective manner and independently of the other lasers if there should be no local fusion of the material along the predetermined trajectory;
         wherein the previously switched off lasers are switched back on along the predetermined trajectory if there should be further local fusion along the predetermined trajectory;
         wherein the one or more lasers are selected in the selective manner such that an area which is effectively irradiated is rectangular.

2. The method as claimed in claim 1, wherein the powdery material comprises a metal.

3. The method as claimed in claim 1, wherein the powdery material consists of a metal alloy.

4. A device for producing a component by carrying out the method as claimed in claim 1, comprising the manufacturing cylinder with the building platform, the storage cylinder, a distribution apparatus, the laser arrangement and a control apparatus, wherein the laser arrangement enables the irradiation of the rectangular area and the lasers are switched on and off individually.

5. The device as claimed in claim 4, wherein the lasers are arranged next to one another in a rectangular pattern.

6. The device as claimed in claim 4, in which a pattern of the laser switching is controlled by the control apparatus.

7. The device as claimed claim 4, wherein a beam path of the laser beams is guidable by rotatable mirrors.

8. The device as claimed in claim 4, wherein the amount of the powdery material is applied on the building platform from a storage cylinder storing the powdery material, wherein a base platform of the storage cylinder is lifted to supply the amount of powdery material.

* * * * *